3,213,744
EXPANSION ANCHOR ASSEMBLY
Arthur C. Wagner, 340 N. 7th St., Lebanon, Pa.
Filed Apr. 23, 1963, Ser. No. 275,125
17 Claims. (Cl. 85—67)

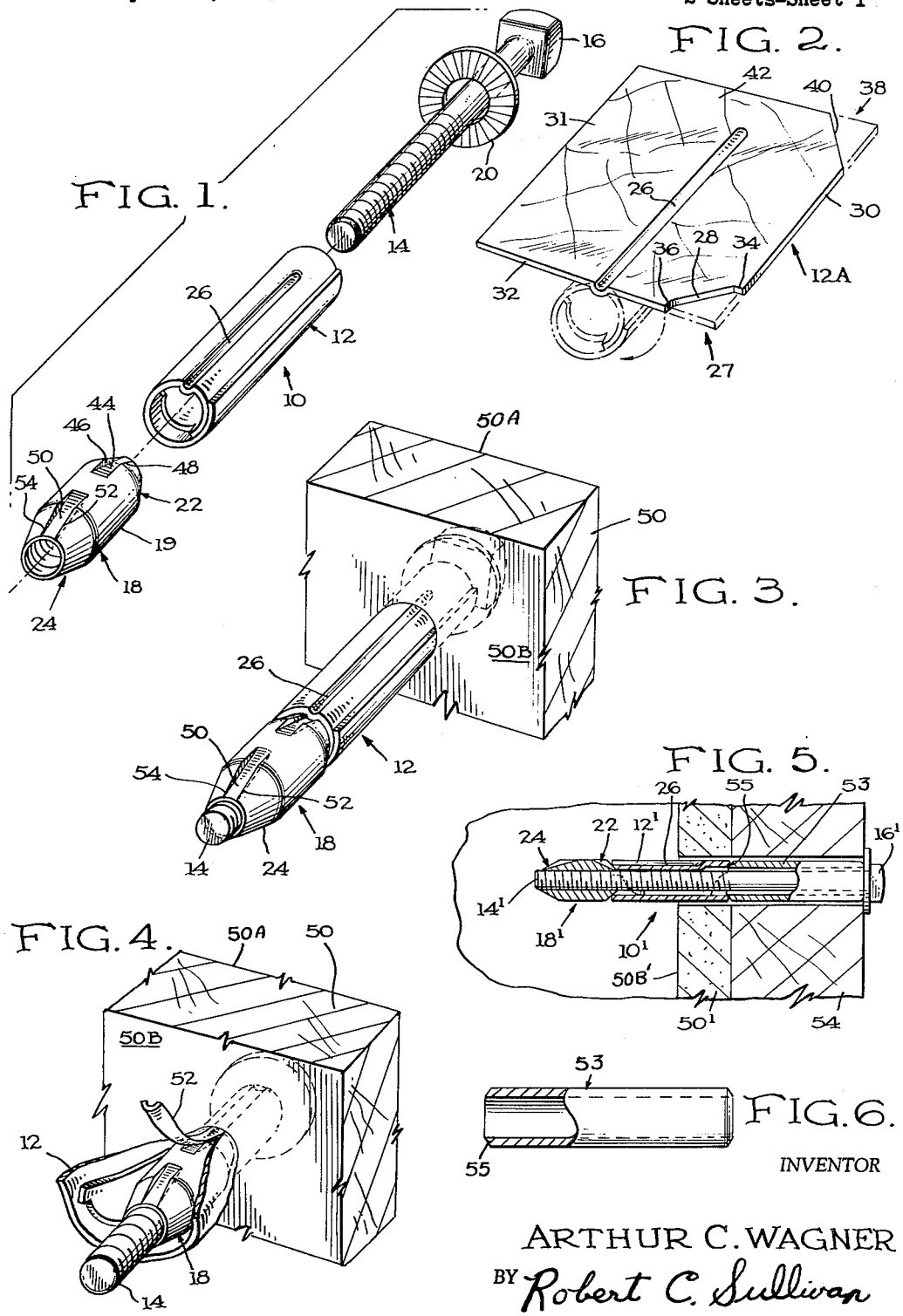

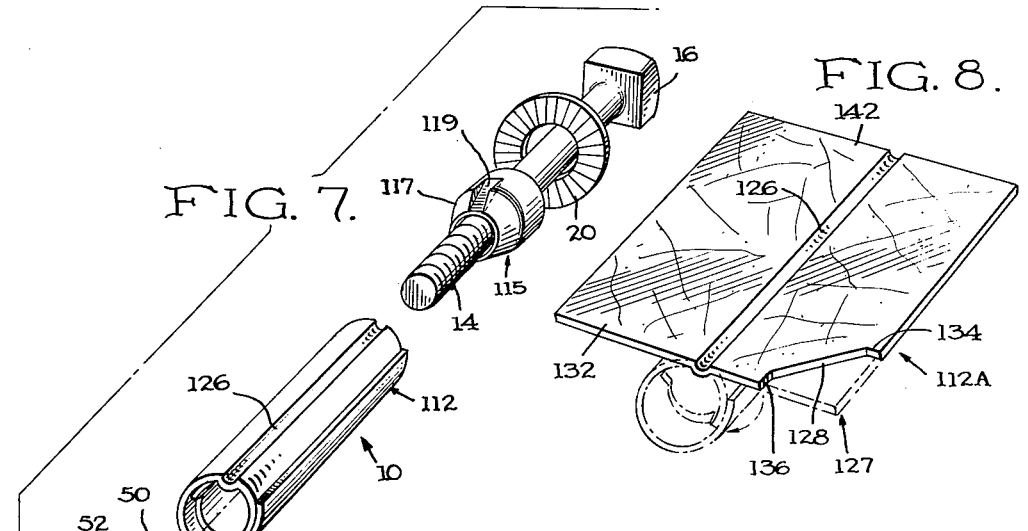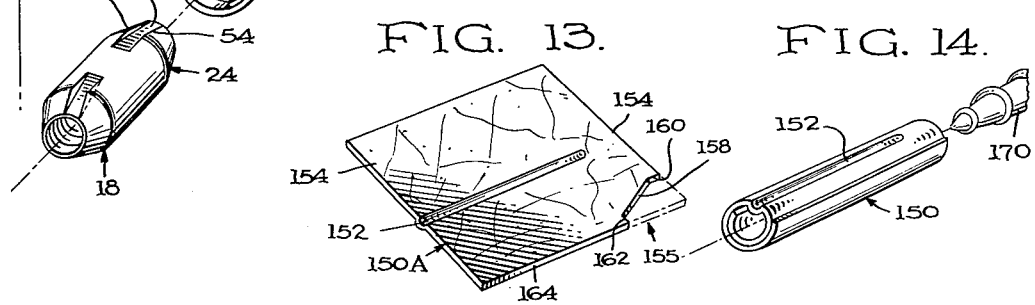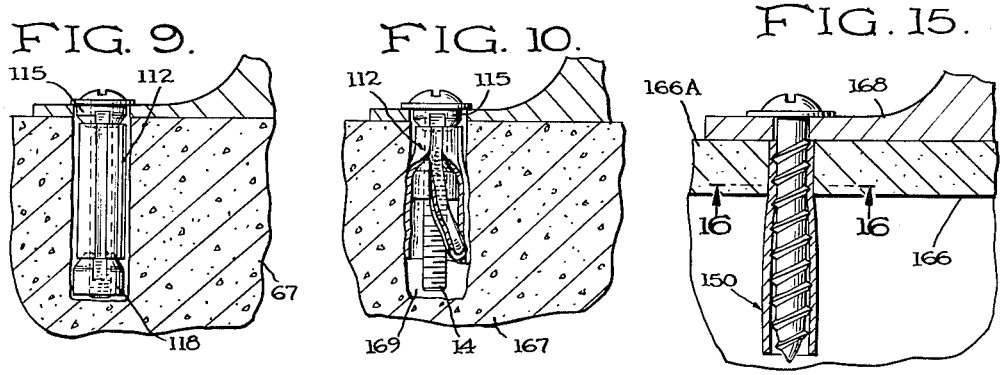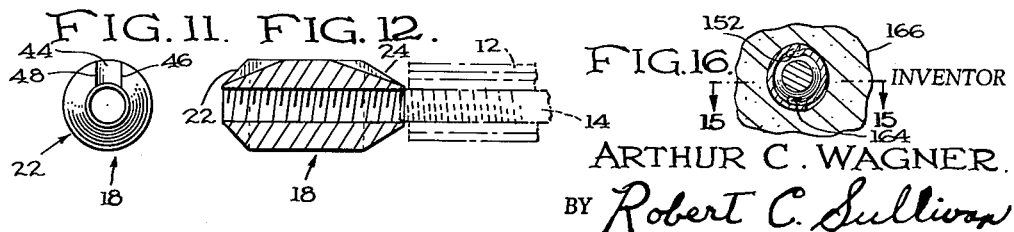
INVENTOR
ARTHUR C. WAGNER.
BY Robert C. Sullivan
ATTORNEY United States Patent Office 3,213,744
Patented Oct. 26, 1965

This invention relates to anchors for fastenings such as screws and bolts, and more particularly to an improved expansion anchor and expansion anchor assembly.

It is an object of this invention to provide an improved expansion anchor assembly which is versatile in its applications and which can be used in many different types of installations, including hollow or solid walls, tile, hard plaster, brick, concrete, stone, spongy materials, and other types of materials.

It is another object of the invention to provide an expansion anchor assembly which has improved holding power as compared to anchors of the prior art.

It is another object of the invention to provide an expansion anchor assembly in which the anchor and fastening means with which it is used can be preassembled ready for use.

It is another object of the invention to provide an expansion anchor and anchor assembly which can be manufactured economically and merchandised at a nominal price.

It is another object of the invention to provide an anchor assembly including auxiliary holding devices which provide increased holding power for certain installations such as solid wall construction or environments subject to excessive vibration.

In achievement of these objectives, there is provided in accordance with an embodiment of this invention an expansion anchor assembly including a convolutely wound anchor sleeve or liner preferably formed of a soft metal such as aluminum. The anchor sleeve is provided with a wedge-like projection which extends radially inwardly from the innermost turn of the anchor for a substantial portion of the length of the anchor in a direction parallel to the longitudinal axis of the anchor. This projection is preferably formed by providing a groove-like indentation in the anchor sleeve, this indentation projecting radially inwardly into the hollow interior of the anchor sleeve. The inwardly extending projection serves as a guide for an axially grooved tapered nut which moves along the threaded surface of a bolt received by the anchor sleeve. The nut member is provided with a tapered end having a maximum diameter greater than the internal diameter of the anchor sleeve, the tapered end having at least one cutting edge which engages and cuts the metal of the anchor as the nut member enters and expands the inner end of the anchor sleeve upon rotation of the bolt. In installations in which the anchor assembly must pass through a considerable thickness of material before reaching the anchoring region, an extension collar may be positioned on the bolt and lockingly engages the forward end of the anchor sleeve when the assembly is tightened. For anchoring in solid walls or in environments having excessive vibration, a "lock-in spreader" having an axially grooved end is used and is positioned on the bolt member in position to engage the forward end of the indentation or groove of the anchor sleeve and to spread the forward end of the anchor sleeve when the anchor assembly is tightened.

The anchor sleeve having the radially inwardly extending projection may also be used to anchor a screw. When a screw is rotated in the anchor sleeve, the inward movement of the screw cams the radially inwardly extending projection of the anchor in such manner as to fold it over onto the innermost turn of the anchor and into wedging engagement with the screw. Also, the camming engagement of the screw with the radially inwardly extending projection causes the innermost edge of the convolutely wound anchor to move into the path of the rotating screw in such manner that the screw engages the innermost edge and folds it over to provide a second wedge engaging the screw within the anchor sleeve.

Further objects and advantages of the invention will become apparent from the following description taken in conjunction with the accompanying drawing in which:

FIGURE 1 is an exploded view of an expansion anchor assembly in accordance with the invention, including the fastening means used with the anchor device;

FIGURE 2 is a perspective view of a metal blank of which the anchor member of FIG. 1 is formed, the blank of FIG. 2 being adapted for anchoring to hollow wall constructions;

FIGURE 3 is a perspective view of the expansion anchor assembly being anchored to a hollow wall construction, before the anchor member is expanded;

FIGURE 4 is a view of the anchor assembly of FIGURE 3 after the anchor member has been expanded;

FIGURE 5 is a view in longitudinal section showing the anchor member of FIGURE 3 used with an extension collar;

FIGURE 6 is an enlarged detail view of an extension collar;

FIGURE 7 is an exploded view of a modified anchor assembly including features which adapt the anchor assembly for use in solid wall construction or in environments subject to excessive vibration;

FIGURE 8 is a perspective view of the blank used to form the anchor member of FIGURE 7;

FIGURE 9 is a view showing an anchor assembly in anchoring position in a solid wall with the expander nut in position ready to expand the anchor sleeve;

FIGURE 10 is a view of the anchor assembly of FIG. 9 after the expander nut has expanded the anchor member;

FIGURE 11 is a view in front elevation of the expander nut used in the embodiments of FIGS. 1–8;

FIGURE 12 is a view in longitudinal section of the expander nut of the embodiments of FIGS. 1–8;

FIGURE 13 is a view of a modified blank used to form an anchor for use with a screw member;

FIGURE 14 is a perspective view, partially broken away, showing an anchor member formed from the blank of FIG. 13 and a screw member with which the anchor member is used;

FIGURE 15 is a view of the anchor assembly of FIG. 14 in anchoring position; and FIGURE 16 is a view taken along section line 16—16 of FIG. 15.

Referring now to the drawing, there is shown in FIG. 1 an anchor assembly generally indicated at 10 including a convolutely wound anchor sleeve or liner generally indicated at 12, a threaded bolt member generally indicated at 14 having a head 16 thereon, and an expander nut 18 positioned adjacent the innermost end of the anchor sleeve in position to enter the anchor sleeve or liner, A washer 20 having a roughened surface is positioned on bolt 14 near the head 16 of the bolt, with the roughened surface facing away from head 16 of the bolt and toward the anchor sleeve.

Nut 18 includes a short tapered end generally indicated at 22, particularly suitable for anchoring in hollow wall constructions, and a long tapered end generally indicated at 24, particularly suited for anchoring in solid wall constructions. Since the short tapered end 22 and the long tapered end 24 each converge from the same outer diameter to the same inner diameter, the short tapered end 22 has a substantially greater or steeper cone angle than the long tapered end 24.

The short tapered end 22 and the long tapered end 24 each respectively have the shape of a truncated cone and each tapered end tapers downwardly from a central cylindrical portion 19 of the expander nut which defines the maximum outer diameter of the tapered end, to a minimum outer diameter which is slightly greater than the outer diameter of the threaded bolt 14.

The blank 12A from which the anchor sleeve 12 is formed is shown in FIG. 2. The blank is designated by a letter subscript to distinguish it from the formed anchor sleeve 12. The blank 12A is preferably formed of a soft metal such as aluminum, although it may also be formed of soft sheet steel or copper. The blank has a length and width suitable for the particular fastening and installation with which it is to be used. The thickness of the blank may be in the approximate range of 1/32 inch to 1/16 inch, for example. The length of the blank in the direction of winding should be sufficient to provide at least one and one-half convolutely wound turns of the anchor member.

In accordance with an important feature of the construction, the blank 12A is formed with a concave-convex indentation or groove 26 which extends parallel to the central longitudinal axis of the blank, the convex surface of indentation 26 providing in the formed anchor sleeve a radially inwardly extending projection which extends axially of the sleeve and into the hollow interior of the sleeve for at least a substantial portion of the length of the sleeve. The groove 26 should be so located with respect to the length of the blank in the direction of winding as to lie in the innermost turn of the convolutely wound anchor, so as to project directly radially inwardly directly into the path of the linearly moving expander nut 18 to provide a wedge-like guide for the expander nut as will be described more fully hereinafter. Groove 26 is formed by a die or other suitable tool. Groove 26 extends for all or a substantial portion of the axial length of the formed anchor, depending upon the type of installation with which the expansion anchor is to be used, as will be explained hereinafter. The blank 12A shown in FIG. 2 is intended for use with hollow wall construction, and the groove 26 extends from the transverse edge 32 of the blank at the end of the anchor where the expander nut 18 enters and terminates a short distance from the opposite transverse edge 42 of the blank.

The reason for terminating groove 26 a short distance from the forward edge 42 of the anchor is the fact that the expander nut does not travel the entire length of the blank and hence it is not necessary to extend the groove 26 the entire length of the blank to the forward edge of the blank. On the other hand, as will be explained hereinafter, in solid wall construction, or in environments subject to excessive vibration, an auxiliary lock-in spreader device shown in FIG. 7 is used at the forward end of the anchor, the auxiliary lock-in spreader device engaging the forward end of a groove which extends for the entire length of the blank.

The blank 12A is provided at the end thereof which is first engaged by expander nut 18 with a cut corner generally indicated at 27, defined by edge 28 which is inclined substantially 45 degrees to the longitudinal and transverse edges 30 and 32 of the blank. The inclined edge 28 does not intersect the longitudinal edge 30 or the transverse edge 32 of the blank but instead is joined thereto by short edge portions 34 and 36 which extend perpendicularly to the respective edges 30 and 32. The function of the cut corner 27 is to reduce the metal thickness at the end of the anchor 12 which is first engaged by expander nut 18 to facilitate the entrance of the tapered end 22 or 24 of the expander nut into the end of the anchor. Cut corner 27 is made of relatively smaller area for a blank 12A which is to be used with the short tapered end 22 of expander nut 18 for anchoring in hollow wall construction than a similar cut corner in a blank used with long tapered end 24 for anchoring in solid wall construction. Thus, the cut corner 27 of the blank 12A of FIG. 2 adapts the anchor sleeve for the entrance of the short tapered end 22 of expander nut 20, whereas the similar cut corner 127 in the blank 112A of FIG. 8 adapts the formed anchor sleeve 112 to the entrance of the long tapered end 24 used for anchoring in solid wall construction.

Blank 12A may also be provided with a cut corner 38 defined by inclined edge 40 which intersects longitudinal edge 30 and transverse edge 42 adjacent the head or forward end of the anchor sleeve. The purpose of cut corner 38 is to reduce the thickness of the metal of the formed anchor sleeve at the forward end thereof to facilitate locking engagement of the tapered end of the extension collar such as that shown in FIG. 6, if an extension collar is used as explained in more detail hereinafter.

The expansion anchor sleeve 12 is formed by convolutely rolling or winding blank 12A of FIG. 2 in a counterclockwise direction, viewed from the end of the blank which is adjacent head 16 of bolt 14, with longitudinal edge 30 being the innermost edge and longitudinal edge 31 being the outermost edge of the formed anchor sleeve. By winding blank 12A in a counterclockwise direction as just described, clockwise rotation of bolt 14 will tend to unwind or expand the formed anchor sleeve.

As best seen in the views of FIGS. 1 and 3, the expander nut 18 which is internally threaded to engage the thread on bolt 14 is provided at the short tapered end 22 with a groove or slot 44 of just slightly greater circumferential dimension than the circumferential dimension of the radially inwardly projecting groove 26 of the anchor sleeve. Groove 44 is bounded on opposite sides thereof by sharpened edges 46 and 48 which constitute cutting edges or blades which engage the material of the formed anchor sleeve adjacent opposite sides of groove 26 to cut the anchor sleeve as the expander nut 18 moves along the thread of bolt 14. Similarly, the long tapered end 24 of expander nut 18 is provided with an axially extending groove or slot 50 bounded on opposite sides thereof by cutting edges 52 and 54. Groove 50 is dimensioned similarly to groove 44 so as to be of slightly greater circumferential dimension than groove 126 of the blank 112A of FIG. 8 so that inwardly projecting groove 126 of FIG. 8 will serve as a guide for the movement of the expander nut and the blades 52 and 54 of long tapered end 24 will cut anchor sleeve 110 of FIG. 7 when the expander nut moves along the bolt of FIG. 7.

While both edges 46 and 48 of tapered end 22 or edges 52 and 54 of tapered end 24 may be sharpened to provide cutting edges, it is only necessary that one edge at each end be sharpened. Thus, at tapered end 22, it will suffice to have edge 48 sharpened, while edge 46 is blunt or unsharpened. Similarly, at the tapered end 24, it will suffice if only edge 54 is sharpened while edge 52 is blunt. If only one edge is sharpened, it should be the left-hand edge, viewed from the forward end of the anchor.

It will be noted that the grooves 44 and 50 at the opposite ends of the expander nut 18 extend axially beyond the respective tapered portions of the nut and into the cylindrical portion 19 of the nut. The sharpened edges or edge, as the case may be, at each end of the expander nut extends for the complete length of groove 44 or 50.

As previously mentioned, each of the tapered ends 22 and 24 of the expander nut 18 is of truncated conical shape and tapers from an inner diameter at the respective forward or leading ends thereof which is just slightly greater than the outer diameter of the thread on bolt 14 to an outer diameter which is greater than the inner diameter of anchor sleeve 12. The fact that the outermost or tip end of each respective tapered end 22 and 24 is only slightly elevated above the surface of the thread on bolt 14 not only facilitates the entry of the tapered end of the expander nut into the end of the anchor sleeve 12, but also serves to clean the thread on the bolt in advance of the rest of expander nut 18 to facilitate the movement of nut 18 along the thread of the bolt.

In assembling the anchor assembly 10 for use with hollow wall construction, the washer 20 with its roughened surface facing inwardly is first positioned on bolt 14 adjacent head 16 of the bolt with the roughened surface of washer 20 facing away from head 16 of the bolt. The formed anchor 12 is then positioned on bolt 14 with the end of the anchor formed by edge 42 directed toward the head end of the bolt. The expander nut 18 is then started on the thread of nut 14 with the short tapered end 22 directed toward the open end of anchor 12. Expander nut 18 is adjusted on bolt 14 so that slot 44 of tapered end 22 is in axial alignment with radially inwardly projecting groove 26 of anchor 12. As best seen in FIG. 3, the anchor assembly just described is then positioned in a pre-drilled hole in the outer face or panel generally indicated at 50 of a hollow wall. The outer face 50 of the hollow wall includes an outer surface 50A and an inner surface 50B. It will be understood that the hollow wall also includes an inner face or panel, not shown in the drawings, which is spaced rearwardly of the outer face 50 to define the hollow wall and that the inner end of the anchor assembly projects into the hollow space between the inner and outer faces or panels of the hollow wall.

With the anchor assembly in position as shown in FIG. 3, the bolt 14 is then rotated in a clockwise direction from the head end 16 of the bolt. The clockwise rotation of bolt 14 will tend to unwind or expand anchor sleeve 12 to cause it to tightly frictionally engage the passage in the outer face 50 of the hollow wall through which it extends.

Clockwise rotation of bolt 14 causes a linear movement of the internally threaded expander nut along the thread of bolt 14, the groove 44 of expander nut 20 moving along the inwardly projecting groove 26 of the anchor sleeve 12 to guide the nut 20 linearly along the thread of bolt 14. As nut 18 advances along the thread of the bolt, the short tapered end 22 of the nut enters the end of the anchor sleeve 12 and after a short movement of the tapered end into the end of the anchor sleeve, the cutting edges 46 and 48 of the nut engage and cut the material of the anchor sleeve on opposite sides of groove 26 to cut a ribbon-like metal strip 52 from the anchor sleeve, as best seen in the view of FIG. 4. If only edge 48 is sharpened, a single line cut is made lengthwise of the anchor sleeve. As the nut continues to move along the thread of bolt 14, the larger diameter portion of the nut follows the tapered cutting end of the nut and, since it has a larger diameter than the inner diameter of anchor sleeve 12, further expands and spreads the anchor sleeve as seen in the view of FIG. 4.

Nut 18 continues to advance along the thread of bolt 14 until the tapered end 22 of the nut enters into wedging engagement with the portion of the material of the anchor which lies within the passsage through outer face or panel 50 of the hollow wall. At this point, the fact that the diameter of nut 18 is greater than the diameter of the passage through panel 50 and also the fact that the metal of anchor 12 has a wedging engagement with the nut 18 when the nut reaches the entrance to the passage through panel 50 of the hollow wall, combine to restrict further linear movement of nut 18 and to tightly lock the nut in wedged position at the entrance at wall surface 50B to the passage through panel 50 of the wall. At the extreme end of the travel of nut 18, the final clockwise turning movement imparted to the bolt 14 causes groove 44 of nut 18 to move out of engagement with the inwardly projecting slot 26 of anchor 12, to thereby provide an off center binding and locking action of the nut on the spread and split anchor.

Although nut 18 in the view of FIG. 4 is tightly wedged in fixed position with respect to the wall 50, the bolt 14 may be unscrewed from the nut if required and may then be reinserted into threaded engagement with the nut.

The roughened surface of washer 20 which is adjacent the head end 16 of bolt 14 frictionally engages the element which is secured to the outer face 50 of the wall to provide an additional locking action.

A countersunk washer or a nylon washer could also be used in place of washer 20.

In certain types of installations, where it is necessary for the fastener to pass through a considerable thickness of material before reaching the region where the fastener is to be anchored, an extension collar or sleeve may be positioned on the portion of the bolt length lying forwardly of the anchoring region. Thus, in FIG. 5, there is shown an anchor assembly generally indicated at 10′ which is similar to the fastener assembly shown in FIG. 1 and includes an anchor sleeve or liner 12′, a bolt 14′, and an expander nut 18′. Anchor assembly 10′ additionally includes an extension collar generally indicated at 53 between the head end 16′ of the bolt and the end of the anchor 12′ which faces the head end of the bolt. The anchor assembly 10′, including the extension collar 53, passes through an outer member indicated at 54, which may be a 2 x 4 wood stud, for example, and then extends through the outer face or panel 50′ of a hollow wall. The bolt 14′ is of sufficient length to pass through both the member 54 and the outer wall face 50′ and to project into the hollow space which lies rearwardly of the wall surface 50B′. The extension collar 53 is formed of steel or other hard metal and has substantially the same outer diameter as the anchor member 12′. Extension collar 53 is unthreaded both internally and externally. Both the anchor member 12′ and the extension collar 53 are of slightly smaller outer diameter than the inner diameter of the passage through members 54 and 50′ through which the anchor assembly including the extension collar passes. The extension collar 53 is slightly tapered at its inner end 55 which abuts the forward end of the anchor sleeve 12′. When the anchor assembly is tightened into position by clockwise rotation of the head 16′ of bolt 14′, expander nut 18 cuts the anchor sleeve and expands the anchor as described in connection with the view of FIG. 4 and additionally the tapered end 55 of extension collar 53 enters a short distance into the abutting outer end of anchor sleeve 12′ to engage the extension collar 53 in tightly locked relation with the forward end of anchor sleeve 12′. Instead of being tapered, the forward end of the extension collar may be roughened.

The blank from which the anchor 12′ of FIG. 5 is formed should have a cut corner 38 at its outer end which abuts the inner tapered end 55 of the extension collar 53, as shown in the blank of FIG. 2, to facilitate the entrance of the tapered end 55 of collar 53 into locking engagement with the outer end of anchor 12′.

Referring now to FIG. 7, there is shown an exploded view of an anchor assembly generally indicated at 110 which is particularly adapted for anchoring to a solid wall and for use in environments subject to excessive vibration. The anchor assembly 110 is generally similar to the anchor assembly 10 shown in FIG. 1 and includes a bolt member 14 having a head 16. A washer 20 having an inwardly facing roughened surface is positioned on bolt 14 near the head 16 of the bolt, or a countersunk or nylon washer may be used instead. A wound anchor 112 is received on bolt 14 and an expander nut 18 is positioned with its long tapered end 24 directed toward the rearwardly facing open end of the anchor 110. The cutting edges 52 and 54 on opposite sides of the groove 50 of the long tapered end 24 are aligned with the radially inwardly projecting surface of groove 126 of the anchor 112. If desired, only the edge 54 need be sharpened, while edge 52 may be blunt. The anchor 112 is formed from a blank 112A shown in FIG. 8 which is generally similar to the blank 12A shown in FIG. 2, except for several differences which will now be described.

One of the differences of blank 112A as compared to blank 12A is that the cut corner 127, bounded by the inclined edge 128 and by short perpendicular edge portions 134 and 136, has a larger cut-away area than the corresponding cut corner 27 of the blank 12A of FIG. 2, since the cut corner 127 of FIG. 8 is adapted to accomodate the longer tapered end 24 of the expander nut 18 to facilitate the entrance of tapered end 24 into the end of anchor 112 which faces tapered end 24.

A second difference of blank 112A as compared to blank 12A is that the groove 126 of blank 112A extends for the entire axial length of the blank from the inner transverse edge 132 to the outer transverse edge 142, which better adapts the forward end of the anchor to engage the lock-in spreader generally indicated at 115. Lock-in spreader 115 is positioned in sliding unthreaded engagement with the forward end of bolt 14 and includes a tapered end 117 having a groove generally indicated at 119 cut therein. The maximum diameter of tapered end 117 is greater than the internal diameter of anchor sleeve 112. Lock-in spreader 115 is so positioned on bolt 14 that the tapered end 117 faces the forward end of anchor sleeve 112. The circumferentially spaced axially extending surfaces bounding groove 119 are not sharpened. The circumferential width of groove 119 in spreader 115 is slightly greater than that of the radially inward projection defined by groove 126 in anchor sleeve 112. When the anchor assembly is tightened, the tapered end 117 of lock-in spreader 115 enters and spreads the forward end of anchor sleeve 112, being guided for linear movement and restrained against rotation by the engagement of groove 119 on the lock-in spreader with the inward projection of groove 126 on the anchor sleeve. The locking engagement of lock-in spreader 115 with the forward end of anchor sleeve 112, in combination with the spreading, cutting, and locking action provided by expander nut 18 provides a very tight anchoring assembly which is particularly suitable for use in solid wall construction and in environments having excessive vibration.

The blank 112A of FIG. 8 is wound in a counterclockwise direction viewed from the head end of the blank (that is, the end of the blank defined by transverse edge 142) to form the anchor 112, so that as the bolt 14 is rotated in a clockwise direction, the anchor will tend to expand or unwind in a clockwise direction into frictional engagement with the passage through which it extends.

The operation of the anchor device of FIGS. 7 and 8 is substantially the same as that previously described in connection with the embodiments of FIGS. 1-5, inclusive, and is illustrated in the views of FIGS. 9 and 10, although these views have been modified to the extent to showing in place of expander nut 18 an expander nut 118 which has only a single tapered or cutting end. Clockwise rotation of the bolt 14 causes expander nut 118 to move along the thread of bolt 14, with the groove 54 of the long tapered end of the expander nut moving along the radially inwardly projecting groove 126 of the anchor 112 to guide the nut 118 linearly along the thread of bolt 14, rotation of nut 118 being prevented by engagement of groove 54 on the nut with groove 126 of the anchor. As nut 118 advances along the thread of the bolt, the cutting edges 52 and 54 engage and cut the material of the anchor sleeve on opposite sides of the groove to cut a ribbon-like metal strip from the anchor. If only edge 54 is sharpened, then a single line cut is made rather than a double line cut. As nut 118 continues to move along the thread of bolt 14, the larger diameter portion of the nut follows the long tapered cutting end 24 of the nut, and since it has a larger diameter than the inner diameter of the anchor sleeve 112, expands and spreads the anchor sleeve into wedging engagement with the interior surface of the drilled hole 169 in the solid wall 167 in which the anchor assembly is positioned.

The use of long tapered end 24 having a smaller conical angle than tapered end 22 is advantageous in anchoring in a hole in a solid wall, since the long tapered end enters a substantial distance into the end of the anchor sleeve and expands it into engagement with the bounding surface of hole 169 adjacent the inner end of the hole before the cutting action of blades 52 and 54, or of blade 54 alone, occurs, thereby providing better frictional engagement of the anchor sleeve with the inner portion of hole 169 than if cutting action were to occur within a shorter interval after the initial entrance of the tapered end into the anchor sleeve, as would occur if a short tapered end were to be used.

At the extreme end of the travel of nut 18, the final clockwise turning movement imparted to the bolt 14 causes groove 50 of nut 18 to move out of engagement with the inwardly projecting slot 26 of anchor sleeve 10, to thereby provide an off center binding action of the nut on the spread and split anchor.

FIGS. 9 and 10 also show the locking engagement of the lock-in spreader 115 with the forward end of anchor 112, as previously explained.

While the views of FIGS. 1, 3, 4, 5, 7, 11 and 12 all show the use of a double-ended expander nut which is adapted for use either in hollow or solid walls, depending on whether the short or long tapered end of the nut is directed toward the open end of the anchor, it is also possible, as shown in FIGS. 9 and 10, to use an expander nut 118 which has only a single tapered end, either a long tapered end similar to the long tapered end 24 for use in solid walls, or a short tapered end, similar to the tapered end 22, for use in hollow wall construction.

To facilitate the cutting action of expander nut 18, the inwardly facing surface of the blank 12A or 112A can be scored along the path of movement of the cutting edge or edges. Scoring of the blank as just described is of particular value where the blank 12A or 112A is made of soft steel.

There is shown in FIG. 13 a blank generally indicated at 150A which is adapted for use with tapered screw fasteners such as lag screws or sheet metal screws. Blank 150A is generally similar to the blanks 12A and 112A previously described, and includes a groove 152 which extends parallel to the longitudinal axis of the blank and extends from the transverse edge 154 at the inner end of the anchor to a short distance from the opposite transverse edge 154 at the outer end of the anchor. Blank 150A is also provided with a cut corner generally indicated at 155 defined by the 45-degree inclined edge 158, the opposite ends of edge 158 being connected by short perpendicular edge portions 160 and 162 to the outer transverse edge 154 and to the inner longitudinal edge 164 of the blank.

The blank 150A of FIG. 13 is wound in a counterclockwise direction in the same manner as described in connection with the other embodiments, to form a convolutely wound anchor generally indicated at 150 in FIG. 14, in which the cut corner 155 faces the head or outer end of the anchor defined by edge 154 to facilitate the entrance of the screw into the anchor. The anchor 150 may be used for anchoring screw fastenings to either hollow or solid wall constructions and in the illustration of FIG. 15, the anchor assembly is shown engaged with the outer panel 166 of a hollow wall and is used to anchor an element 168 to the outer surface 166A of panel 166.

As the end of the screw 170 enters the formed anchor 150 in the installation shown in FIG. 15, the tapered end of the screw enters a short distance into the formed anchor before coming into engagement with the forward end of the inward projection of the groove 152. As the screw continues further clockwise rotation in the anchor 150, it tends to expand the counterclockwise wound anchor into frictional engagement with the passage through the wall face or panel 166.

Also, the length of the groove 152 and its spacing from forward transverse edge 154 of the anchor blank 150A are made such that the forward end of groove 152 is closer to forward transverse edge 154 than straight edge portion 162 of cut corner 156 is to forward transverse edge 154. This relationship of the length of inward projection 152 to the location of straight edge portion 162 causes the inwardly advancing screw 170 to engage the end of inward projection 152 before it reaches straight edge 162. As the screw first engages the radially inward projection of groove 152 it begins to cam the projection into overlapped relation to the innermost turn of the anchor sleeve. This camming action on projection 152 causes a movement of the innermost edge 164 of blank 150A such that the advancing screw cammingly engages edge 164 and folds it over as best seen in the view of FIG. 16, to thereby provide a second wedge lying within the interior of the anchor sleeve and engaging the screw in wedging relation.

By suitably adjusting the spacing lengthwise of the blank of radially inward projection 152 from innermost longitudinal edge 164, the engagement of the inwardly advancing screw 170 can be caused to either cam edge 164 into overlapping relation to the innermost turn of the convolutely wound anchor, or so as not to cam edge 164 into overlapping relation, as desired. This permits adjustment of the interior diameter of a given anchor sleeve for screws of different sizes.

It can be seen from the foregoing that there are provided in accordance with this invention improved expansion anchors which are versatile in their applications and which can be used in many different types of installations. For example, the anchor devices of the invention can be used for anchoring all types of brackets, studding and the like to solid masonry or to hollow walls, as well as to repair furniture, to join panels, or to mount pipe straps on solid or hollow walls. These are but a few examples of the various uses of the anchor devices hereinbefore described.

The various components of the anchor assembly can be packaged in kits for on-the-job assembly as needed for the type work being done or, alternatively, can be preassembled ready for use.

The anchor devices of the invention have improved holding power as compared to anchor devices of the prior art and can be manufactured economically and merchandised at a nominal price.

While there have been shown and described particular embodiments of the invention, it will be obvious to those skilled in the art that various changes and modifications may be made therein without departing from the invention and, therefore, it is aimed to cover all such changes and modifications as fall within the true spirit and scope of the invention.

What I claim as my invention is:

1. An expansion anchor assembly comprising a tubular anchor sleeve, said anchor sleeve including a radially inwardly extending projection extending axially of said sleeve and into the hollow interior of said sleeve for a substantial portion of the length of said sleeve, a threaded bolt positioned in said anchor sleeve and including an end projecting beyond a corresponding end of said anchor sleeve, an expander nut threadedly engaged with said end of said bolt, said expander nut including a tapered end engageable with a facing end of said anchor sleeve, said expander nut having a maximum outer diameter greater than the inner diameter of said anchor sleeve, a groove on said expander nut engageable in interlocking sliding engagement with said radially inwardly extending projection of said anchor sleeve as said expander nut moves linearly and non-rotatably along the thread of said bolt, and at least one bounding wall of said groove being sharpened to provide a cutting means, whereby linear movement of said expander nut along the thread of said bolt is effective to cut said anchor sleeve adjacent said projection and to expand the material of said anchor sleeve.

2. An expansion anchor assembly comprising a tubular anchor sleeve, said anchor sleeve including a radially inwardly extending projection extending axially of said sleeve and into the hollow interior of said sleeve for a substantial portion of the length of said sleeve, a threaded bolt positioned in said anchor sleeve and including a rearwardly facing end projecting rearwardly beyond the normally rearwardly facing end of said anchor sleeve, an expander nut threadedly engaged with said end of said bolt, said expander nut including a tapered forward end engageable with the normally rearwardly facing end of said anchor sleeve, said expander nut having a maximum outer diameter greater than the inner diameter of said anchor sleeve, a groove at the forward end of said expander nut engageable in interlocking sliding engagement with said radially inwardly extending projection of said anchor sleeve as said expander nut moves linearly and non-rotatably along the thread of said bolt, and at least one bounding wall of said groove being sharpened to provide a cutting means, whereby linear movement of said expander nut along the thread of said bolt is effective to cut said anchor sleeve adjacent said projection and to expand the material of said anchor sleeve.

3. An expansion anchor assembly comprising a tubular anchor sleeve, said anchor sleeve including a radially inwardly extending projection extending axially of said sleeve and into the hollow interior of said sleeve for a substantial portion of the length of said sleeve, a threaded bolt positioned in said anchor sleeve and including a rearwardly facing end projecting rearwardly beyond the normally rearwardly facing end of said anchor sleeve, an expander nut including a conically tapered forward end engageable with the normally rearwardly facing end of said anchor sleeve, said expander nut having a maximum outer diameter greater than the inner diameter of said anchor sleeve, a groove at said forward end of said expander nut, said groove being engageable in interlocking sliding engagement with said radially inwardly extending projection of said anchor sleeve as said expander nut moves along the thread of said bolt member, at least one bounding wall of said groove being sharpened to provide a cutting means, whereby linear movement of said expander nut along the thread of said bolt is effective to cut said anchor sleeve adjacent said projection and to expand the material of said anchor sleeve.

4. An expansion anchor assembly comprising a convolutely wound anchor sleeve, said anchor sleeve including a radially inwardly extending projection extending axially of said sleeve and into the hollow interior of said sleeve for a substantial portion of the length of said sleeve, a threaded bolt positioned in said anchor sleeve and including an end projecting beyond a corresponding end of said anchor sleeve, an expander nut threadedly engaged with said end of said bolt, said expander nut including a tapered end engageable with a facing end of said anchor sleeve, said expander nut having a maximum outer diameter greater than the inner diameter of said anchor sleeve, a groove on said expander nut engageable in interlocking sliding engagement with said radially inwardly extending projection of said anchor sleeve as said expander nut moves linearly and non-rotatably along the thread of said bolt, and at least one bounding wall of said groove being sharpened to provide a cutting means whereby linear movement of said expander nut along the thread of said bolt is effective to cut said anchor sleeve adjacent said projection and to expand the material of said anchor sleeve.

5. An expansion anchor assembly as defined in claim 4 in which said anchor sleeve is formed from a generally rectangular-shaped metal blank, said anchor sleeve having a portion thereof cut away in the innermost turn of the convolutely wound anchor sleeve at the end of said sleeve first entered by said tapered end of said expander nut, to thereby facilitate the entrance of the tapered end of said expander nut into said anchor sleeve.

6. An expansion anchor assembly comprising a convolutely wound anchor sleeve, said anchor sleeve including a radially inwardly extending projection extending axially of said sleeve and into the hollow interior of said sleeve for a substantial portion of the length of said sleeve, a threaded bolt positioned in said anchor sleeve and including a rearwardly facing end projecting rearwardly beyond the normally rearwardly facing end of said anchor sleeve, an expander nut threadedly engaged with said end of said bolt, said expander nut including a conically tapered forward end engageable with the normally rearwardly facing end of said anchor sleeve, said expander nut having a maximum outer diameter greater than the inner diameter of said anchor sleeve, a groove at said forward end of said expander nut, said groove being engageable in interlocking sliding engagement with said radially inwardly extending projection of said anchor sleeve as said expander nut moves linearly and nonrotatably along the thread of said bolt member, at least one bounding wall of said groove being sharpened to provide a cutting means, whereby linear movement of said expander nut along the thread of said bolt is effective to cut said anchor sleeve adjacent said projection and to expand the material of said anchor sleeve.

7. In combination, an expansion anchor assembly comprising a tubular anchor sleeve, said anchor sleeve including a radially inwardly extending projection extending axially of said sleeve and into the hollow interior of said sleeve for a substantial portion of the length of said sleeve, a threaded bolt positioned in said anchor sleeve and including an end projecting beyond a corresponding end of said anchor sleeve, an expander nut including a tapered end engageable with said corresponding end of said anchor sleeve, said expander nut having a maximum outer diameter greater than the inner diameter of said anchor sleeve, a groove on said expander nut engageable in interlocking sliding engagement with said radially inwardly extending projection of said anchor sleeve as said expander nut moves linearly and non-rotatably along the thread of said bolt, at least one bounding wall of said groove being sharpened to provide a cutting means whereby linear movement of said expander nut along the thread of said bolt is effective to cut said anchor sleeve adjacent said projection and to expand the material of said anchor sleeve, an extension collar positioned on said bolt between the opposite end of said bolt and the opposite end of said anchor sleeve, and means on the end of said extension collar facing said opposite end of said anchor sleeve to cause interlocking engagement between said extension collar and said anchor sleeve when expansion anchor assembly is tightened.

8. The combination defined in claim 7 in which said extension collar is tapered at the end thereof which engages said anchor sleeve and said anchor sleeve has a portion of the innermost turn thereof cut away at the end of said sleeve engaged by said extension collar to facilitate the locking engagement of said extension collar with said anchor sleeve.

9. In combination, an expansion anchor assembly comprising a convolutely wound metal anchor sleeve, said anchor sleeve including a radially inwardly extending projection extending axially of said sleeve and into the hollow interior of said sleeve for the entire length of said sleeve, a threaded bolt positioned in said anchor sleeve and including an end projecting beyond a corresponding end of said anchor sleeve, an expander nut threadedly engaged with said end of said bolt, said expander nut including a tapered end engageable with said end of said anchor sleeve, said expander nut having a maximum outer diameter greater than the inner diameter of said anchor sleeve, a groove on said expander nut engageable in interlocking sliding engagement with said radially inwardly extending projection of said anchor sleeve as said expander nut moves linearly and non-rotatably along the thread of said bolt, at least one bounding wall of said groove being sharpened to provide a cutting means, whereby linear movement of said expander nut along the thread of said bolt is effective to cut said anchor sleeve adjacent said projection and to expand the material of said anchor sleeve, a spreader member positioned on said bolt between the opposite end of said bolt and the opposite end of said anchor sleeve, said spreader member having a tapered end engageable with said opposite end of said anchor sleeve, said tapered end of said spreader member having a maximum diameter greater than the inner diameter of said anchor sleeve, and groove means at said tapered end of said spreader member, said groove means of said spreader member slidably and lockingly engaging said radially inwardly extending projection of said anchor sleeve when said anchor assembly is tightened.

10. An expansion anchor assembly comprising a tubular anchor sleeve, said anchor sleeve including a radially inwardly extending concave-convex indent extending axially of said sleeve and into the hollow interior of said sleeve for a substantial portion of the length of said sleeve, a threaded bolt positioned in said anchor sleeve and including an end projecting beyond a corresponding end of said anchor sleeve, an expander nut threadedly engaged with said end of said bolt, said expander nut including a tapered end engageable with a facing end of said anchor sleeve, said expander nut having a maximum outer diameter greater than the inner diameter of said anchor sleeve, said expander nut having a groove receiving said indent whereby to guide said nut linearly and non-rotatably along the thread of said bolt, at least one bounding wall of said groove being sharpened to provide a cutting means, whereby linear movement of said expander nut along the thread of said bolt is effective to cut and expand the material of said anchor sleeve.

11. An expansion anchor assembly comprising a tubular anchor sleeve, said anchor sleeve including a radially inwardly extending concave-convex projection extending axially of said sleeve and into the hollow interior of said sleeve for a substantial portion of the length of said sleeve, a threaded bolt positioned in said anchor sleeve and including an end projecting rearwardly beyond the normally rearwardly facing end of said sleeve, an expander nut threadedly engaged with said end of said bolt, said expander nut including a tapered forward end engageable with the normally rearwardly facing end of said anchor sleeve, said expander nut having a maximum outer diameter greater than the inner diameter of said anchor sleeve, said expander nut having a groove receiving said indent whereby to guide said nut linearly and non-rotatably along the thread of said bolt, at least one bounding wall of said groove being sharpened to provide a cutting means, whereby linear movement of said expander nut along the thread of said bolt is effective to cut and expand the material of said anchor sleeve.

12. An expansion anchor assembly comprising a convolutely wound anchor sleeve, said anchor sleeve including a radially inwardly extending concave-convex indent extending axially of said sleeve and into the hollow interior of said sleeve for a substantial portion of the length of said sleeve, a threaded bolt positioned in said anchor sleeve and including an end projecting beyond a corresponding end of said anchor sleeve, an expander nut threadedly engaged with said end of said bolt, said expander nut including a tapered end engageable with a facing end of said anchor sleeve, said expander nut having a maximum outer diameter greater than the inner diameter of said anchor sleeve, said expander nut having a groove receiving said indent whereby to guide said nut linearly and non-rotatably along the thread of said bolt, at least one bounding wall of said groove being sharpened to provide a cutting means, whereby linear movement of said expander nut along the thread of said bolt is effective to cut and expand the material of said anchor sleeve.

13. An expansion anchor assembly as defined in claim 12 in which one of the convolutions of said convolutely wound anchor sleeve is indented to form a groove which extends radially inwardly from a surface of said convolution and into the hollow interior of said sleeve for a substantial portion of the axial length of said sleeve.

14. An expansion anchor assembly as defined in claim 12 in which said anchor sleeve is formed from a generally rectangular-shaped metal blank, said anchor sleeve having a portion thereof cut away in the innermost turn of the convolutely wound anchor sleeve at the end of said sleeve first entered by said tapered end of said expander nut, to thereby facilitate the entrance of the tapered end of said expander nut into said anchor sleeve.

15. In combination, an expansion anchor assembly comprising a tubular anchor sleeve, said anchor sleeve including a radially inwardly extending concave-convex indent extending axially of said sleeve and into the hollow interior of said sleeve for a substantial portion of the length of said sleeve, a threaded bolt positioned in said anchor sleeve and including an end projecting beyond a corresponding end of said anchor sleeve, an expander nut including a tapered end engageable with said corresponding end of said anchor sleeve, said expander nut having a maximum outer diameter greater than the inner diameter of said anchor sleeve, said expander nut having a groove receiving said indent whereby to guide said nut linearly and non-rotatably along the thread of said bolt, at least one boundary wall of said groove being sharpened to provide a cutting means whereby linear movement of said expander nut along the thread of said bolt is effective to cut and expand the material of said anchor sleeve, an extension collar positioned on said bolt between the opposite end of said bolt and the opposite end of said sleeve, and means on the end of said extension collar facing said opposite end of said anchor sleeve to cause interlocking engagement between said extension collar and said anchor sleeve when said expansion anchor assembly is tightened.

16. The combination defined in claim 15 in which said extension collar is tapered at the end thereof which engages said anchor sleeve and said anchor sleeve has a portion of the innermost turn thereof cut away at the end of said sleeve engaged by said extension collar to facilitate the locking engagement of said extension collar with said anchor sleeve.

17. In combination, an expansion anchor assembly comprising a convolutely wound metal anchor sleeve, said anchor sleeve including a radially inwardly extending concave-convex indent extending axially of said sleeve and into the hollow interior of said sleeve for the entire length of said sleeve, a threaded bolt positioned in said anchor sleeve and including an end projecting beyond a corresponding end of said anchor sleeve, an expander nut threadedly engaged with said end of said bolt, said expander nut including a tapered end engageable with said end of said anchor sleeve, said expander nut having a maximum outer diameter greater than the inner diameter of said anchor sleeve, said expander nut having a groove receiving said indent whereby to guide said nut linearly and non-rotatably along the thread of said bolt, at least one bounding wall of said groove being sharpened to provide a cutting means, whereby linear movement of said expander nut along the thread of said bolt is effective to cut and expand the material of said anchor sleeve, a spreader member positioned on said bolt between the opposite end of said bolt and the opposite end of said anchor sleeve, said spreader member having a tapered end engageable with said opposite end of said anchor sleeve, said tapered end of said spreader member having a maximum diameter greater than the inner diameter of said anchor sleeve, and groove means at said tapered end of said spreader member, said groove means of said spreader member slidably and lockingly engaging said radially inwardly extending indent of said anchor sleeve when said anchor assembly is tightened.

References Cited by the Examiner

UNITED STATES PATENTS

| 831,464 | 9/06 | O'Leary. | |
|---|---|---|---|
| 937,039 | 10/09 | Bauer | 85—74 |
| 1,120,410 | 12/14 | Rohmer et al. | |
| 1,350,562 | 8/20 | Ogden. | |
| 1,934,560 | 11/33 | Rawlings. | |
| 2,381,113 | 8/45 | Cook | 85—40 |
| 2,435,876 | 2/48 | De Swart | 85—40 |
| 3,136,202 | 6/64 | Wagner | 85—85 |

FOREIGN PATENTS

| 209,951 | 8/57 | Australia. |
|---|---|---|
| 1,261,615 | 4/61 | France. |
| 210,028 | 1/08 | Germany. |
| 1,035,410 | 7/58 | Germany. |
| 698,307 | 10/53 | Great Britain. |

CARL W. TOMLIN, *Primary Examiner.*

EDWARD C. ALLEN, *Examiner.*